US012103390B2

(12) United States Patent
Nishida

(10) Patent No.: US 12,103,390 B2
(45) Date of Patent: Oct. 1, 2024

(54) BATTERY STATE DISPLAY DEVICE, BATTERY STATE DISPLAY METHOD, AND PROGRAM

(71) Applicant: HONDA MOTOR CO., LTD., Tokyo (JP)

(72) Inventor: Yoshikazu Nishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 376 days.

(21) Appl. No.: 17/611,579

(22) PCT Filed: May 21, 2019

(86) PCT No.: PCT/JP2019/020010
§ 371 (c)(1),
(2) Date: Nov. 16, 2021

(87) PCT Pub. No.: WO2020/234982
PCT Pub. Date: Nov. 26, 2020

(65) Prior Publication Data
US 2022/0227229 A1 Jul. 21, 2022

(51) Int. Cl.
*B60K 35/00* (2024.01)
*B60K 35/28* (2024.01)
(Continued)

(52) U.S. Cl.
CPC ............ *B60K 35/00* (2013.01); *H02J 7/0049* (2020.01); *H02J 7/005* (2020.01); *B60K 35/28* (2024.01);
(Continued)

(58) Field of Classification Search
CPC ........ B60K 35/00; B60K 35/28; B60K 35/90; B60K 2360/169; B60K 35/22;
(Continued)

(56) References Cited

U.S. PATENT DOCUMENTS

2009/0108803 A1* 4/2009 Singarajan .......... H01M 10/488
320/105
2013/0076366 A1 3/2013 Arizono et al.
(Continued)

FOREIGN PATENT DOCUMENTS

JP 2004-144628 5/2004
JP 2009-208484 9/2009
(Continued)

OTHER PUBLICATIONS

International Search Report and Written Opinion for International Application No. PCT/JP2019/020010 mailed on Jul. 16, 2019, 8 pages.

*Primary Examiner* — Yonel Beaulieu
(74) *Attorney, Agent, or Firm* — Amin, Turocy & Watson, LLP

(57) ABSTRACT

A battery state display device includes an acquirer configured to acquire a full charge capacity of a secondary battery mounted in a vehicle, a display configured to display an image, and a display controller configured to control the display so that a display process before a prescribed time point is performed on the basis of a ratio of a full charge capacity at a time point before the prescribed time point to a full charge capacity of the secondary battery at an initial time point and a display process after the prescribed time point is performed to display an image based on a ratio of a full charge capacity at a time point after the prescribed time point to a full charge capacity at the prescribed time point.

7 Claims, 5 Drawing Sheets

(51) Int. Cl.
*B60K 35/90* (2024.01)
*H02J 7/00* (2006.01)

(52) U.S. Cl.
CPC ........ *B60K 35/90* (2024.01); *B60K 2360/169* (2024.01)

(58) Field of Classification Search
CPC ........ H02J 7/0049; H02J 7/005; H02J 7/0047; H02J 7/0048
See application file for complete search history.

(56) References Cited

U.S. PATENT DOCUMENTS

| | | | |
|---|---|---|---|
| 2015/0348058 A1* | 12/2015 | Liu | G06Q 30/0201 701/31.5 |
| 2018/0156873 A1 | 6/2018 | Matsuyama et al. | |

FOREIGN PATENT DOCUMENTS

| | | |
|---|---|---|
| JP | 2011-257213 | 12/2011 |
| JP | 2013-032132 | 2/2013 |
| WO | 2016/194082 | 12/2016 |

* cited by examiner

BATTERY STATE DISPLAY DEVICE, BATTERY STATE DISPLAY METHOD, AND PROGRAM

TECHNICAL FIELD

The present invention relates to a battery state display device, a battery state display method, and a program.

BACKGROUND ART

Conventionally, there is technology for displaying a battery state of a secondary battery in an electric vehicle (see, for example, Patent Literature 1). When the battery state of the secondary battery is displayed, for example, a ratio of a full charge capacity at a present time point to a full charge capacity of the secondary battery at an initial time point is displayed using an icon or the like.

CITATION LIST

Patent Literature

[Patent Literature 1]
PCT International Publication No. WO 2016/194082

SUMMARY OF INVENTION

Technical Problem

Because a secondary battery mounted in an electric vehicle deteriorates due to use, the display is assumed to be made in a state in which the deterioration has progressed from the time of purchase in the case where the electric vehicle is resold or the like. For this reason, a purchaser may feel that he/she has lost money and feel uncomfortable.

The present invention has been made in consideration of such circumstances and provides a battery state display device, a battery state display method, and a program capable of reducing a feeling of discomfort given to a user.

Solution to Problem

A battery state display device, a battery state display method, and a program according to the present invention adopt the following configurations.

(1): According to an aspect of the present invention, there is provided a battery state display device including: an acquirer configured to acquire a full charge capacity of a secondary battery mounted in a vehicle; a display configured to display an image; and a display controller configured to control the display so that a display process before a prescribed time point is performed on the basis of a ratio of a full charge capacity at a time point before the prescribed time point to a full charge capacity of the secondary battery at an initial time point and a display process after the prescribed time point is performed to display an image based on a ratio of a full charge capacity at a time point after the prescribed time point to a full charge capacity at the prescribed time point.

(2): In the above-described aspect (1), the prescribed time point is a time point when the vehicle has been resold.

(3): In the above-described aspect (1), the display controller controls the display so that a display process after an operation on an execution switch is performed is performed on the basis of a ratio of a full charge capacity at a time point after the operation to a full charge capacity at a time point when the operation on the execution switch has been performed.

(4): In the above-described aspect (1), the execution switch is provided in the vehicle.

(5): In the above-described aspect (1), the display controller causes the display to display information indicating that the display process based on the ratio of the full charge capacity to the full charge capacity at the prescribed time point is being performed on the basis of the prescribed time point.

(6): In the above-described aspect (5), the display controller causes the display to display the information indicating that the display process based on the ratio of the full charge capacity to the full charge capacity at the prescribed time point is being performed on the basis of the prescribed time point in a form in which it is difficult for a general user to understand the information.

(7): According to an aspect of the present invention, there is provided a battery state display method including: acquiring, by a computer, a full charge capacity of a secondary battery mounted in a vehicle; controlling, by the computer, displaying of an image so that a display process before a prescribed time point is performed on the basis of a ratio of a full charge capacity at a time point before the prescribed time point to a full charge capacity of the secondary battery at an initial time point and a display process after the prescribed time point is performed on the basis of a ratio of a full charge capacity at a time point after the prescribed time point to a full charge capacity at the prescribed time point; and displaying, by the computer, the image.

(8): According to an aspect of the present invention, there is provided a program for causing a computer to: acquire a full charge capacity of a secondary battery mounted in a vehicle; control displaying of an image so that a display process before a prescribed time point is performed on the basis of a ratio of a full charge capacity at a time point before the prescribed time point to a full charge capacity of the secondary battery at an initial time point and a display process after the prescribed time point is performed on the basis of a ratio of a full charge capacity at a time point after the prescribed time point to a full charge capacity at the prescribed time point; and display the image.

Advantageous Effects of Invention

According to (1) to (8), it is possible to reduce a feeling of discomfort given to a user.

DESCRIPTION OF EMBODIMENTS

Hereinafter, embodiments of a battery state display device, a battery state display method, and a program of the present invention will be described with reference to the drawings. The following embodiments do not limit the present invention covered by claims. Also, not all combinations of features described in the embodiments are necessary for solutions of the present invention. Although a vehicle 10 is assumed to be an electric vehicle, the vehicle 10 may be a hybrid vehicle or a fuel cell vehicle as long as it is a vehicle equipped with a secondary battery that supplies electric power for traveling of the vehicle 10.

Figure 1:
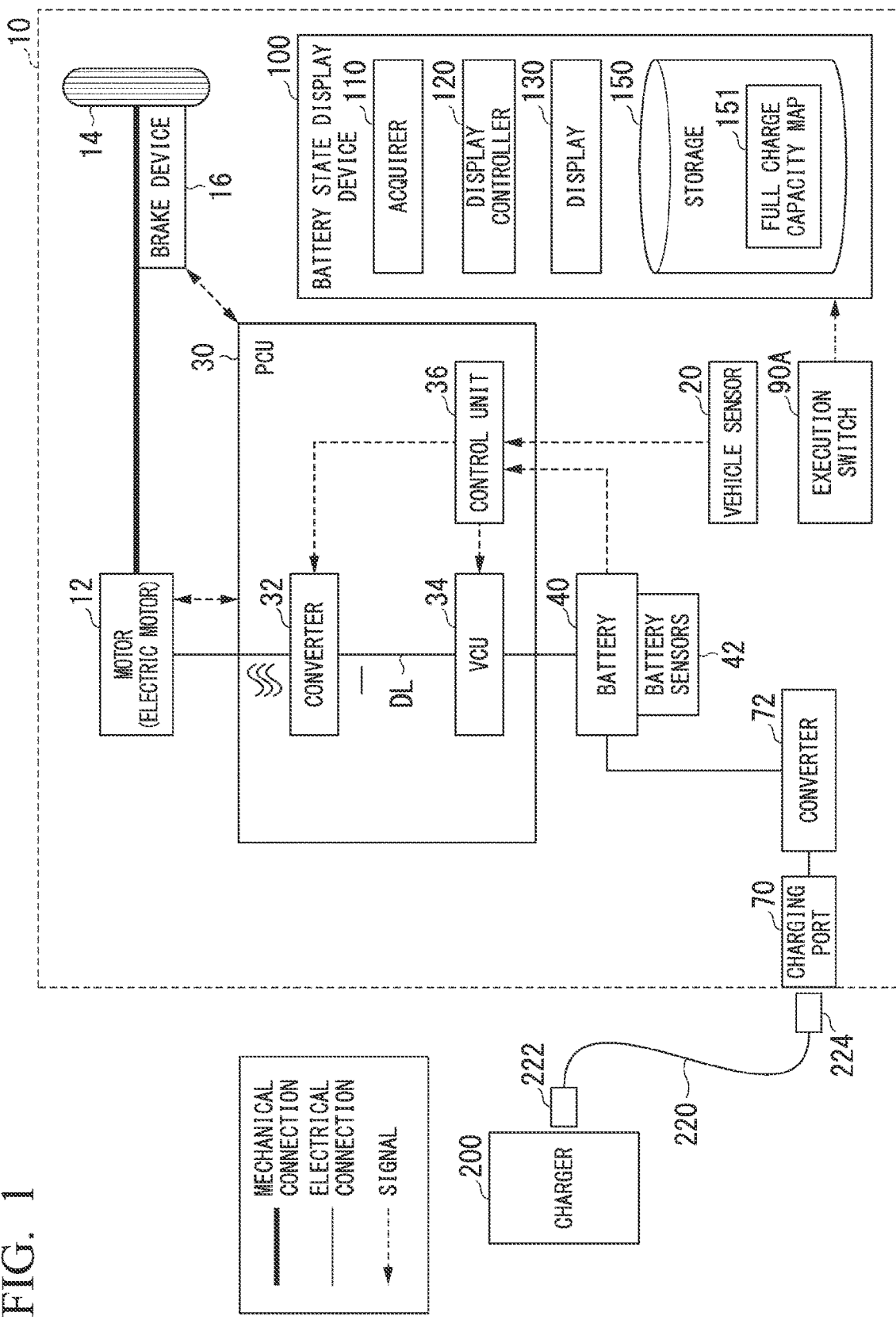
FIG. 1 is a diagram showing an example of a configuration of a vehicle 10 including a battery state display device 100 according to an embodiment.

FIG. 1 is a diagram showing an example of a configuration of the vehicle 10 including a battery state display device 100 according to the embodiment. As shown in FIG. 1, the battery state display device 100 is provided in a plurality of vehicles 10. The battery state display device 100 displays a battery state of a battery (which is hereinafter assumed to be synonymous with a secondary battery) mounted in the vehicle 10.

[Vehicle 10]

As shown in FIG. 1, the vehicle 10 includes, for example, a motor 12, drive wheels 14, a brake device 16, a vehicle sensor 20, a power control unit (PCU) 30, a battery 40, battery sensors 42 such as a voltage sensor, a current sensor, and a temperature sensor, a charging port 70, a converter 72, a steering switch 90, and a battery state display device 100.

The motor 12 is, for example, a three-phase alternating current (AC) electric motor. A rotor of the motor 12 is connected to the drive wheels 14. The motor 12 outputs motive power to the drive wheels 14 using electric power that is supplied. Also, the motor 12 generates electric power using kinetic energy of the vehicle when the vehicle is decelerated.

The brake device 16 includes, for example, a brake caliper, a cylinder that transfers hydraulic pressure to the brake caliper, and an electric motor that generates hydraulic pressure in the cylinder. The brake device 16 may include a mechanism that transfers hydraulic pressure generated by the operation of the brake pedal to the cylinder via a master cylinder as a backup. Also, the brake device 16 is not limited to the above-described configuration and may be an electronically controlled hydraulic brake device that transfers the hydraulic pressure of the master cylinder to the cylinder.

The vehicle sensor 20 includes an accelerator opening degree sensor, a vehicle speed sensor, and a brake depression amount sensor. The accelerator opening degree sensor is attached to an accelerator pedal, which is an example of an operation element for receiving an acceleration instruction from a driver, detects an amount of operation of the accelerator pedal, and outputs the detected amount of operation as an accelerator opening degree to a control unit 36. The vehicle speed sensor includes, for example, a wheel speed sensor and a speed calculator attached to each wheel and combines wheel speeds detected by wheel speed sensors to derive the speed of the vehicle (a vehicle speed) and outputs the derived speed to the control unit 36 and a display device 60 The brake depression amount sensor is attached to the brake pedal, detects the amount of operation of the brake pedal, and outputs the detected amount of operation as an amount of brake depression to the control unit 36.

The PCU 30 includes, for example, a converter 32, a voltage control unit (VCU) 34, and the control unit 36. Also, a group of the above components is configured as the PCU 34 as only an example and these components may be arranged in a distributed form.

The converter 32 is, for example, an AC-direct current (DC) converter. A DC side terminal of the converter 32 is connected to a DC link DL. The battery 40 is connected to the DC link DL via the VCU 34. The converter 32 converts an AC generated by the motor 12 into a DC and outputs the DC to the DC link DL.

The VCU 34 is, for example, a DC-DC converter. The VCU 34 boosts electric power supplied by the battery 40 and outputs the boosted electric power to the DC link DL.

The control unit 36 includes, for example, a motor control unit, a brake control unit, and a battery/VCU control unit. The motor control unit, the brake control unit, and the battery/VCU control unit may be replaced with separate control devices such as a motor ECU, a brake ECU, and a battery ECU.

The motor control unit controls the motor 12 on the basis of an output of the vehicle sensor 20. The brake control unit controls the brake device 16 on the basis of an output of the vehicle sensor 20. The battery/VCU control unit calculates a state of charge (SOC) (hereinafter also referred to as a "battery charge rate") of the battery 40 on the basis of an output of the battery sensor 42 attached to the battery 40. In battery/VCU control, the calculated SOC is output to the VCU 34. The VCU 34 causes a voltage of the DC link DL to be raised in accordance with an instruction from the battery/VCU control unit.

The battery 40 is, for example, a secondary battery such as a lithium-ion battery. The battery 40 stores electric power introduced from a charger 200 outside the vehicle 10 and is discharged with the electric power for traveling of the vehicle 10. The battery sensors 42 include, for example, a current sensor, a voltage sensor, and a temperature sensor. The battery sensors 42 detect, for example, a current value, a voltage value, and a temperature of the battery 40. The battery sensors 42 output the detected current value, voltage value, and temperature and the like to the control unit 36.

The charging port 70 is provided oriented toward outside of the vehicle body of the vehicle 10. The charging port 70 is connected to the charger 200 via a charging cable 220. The charging cable 220 includes a first plug 222 and a second plug 224. The first plug 222 is connected to the charger 200 and the second plug 224 is connected to the charging port 70. The electricity supplied from the charger 200 is supplied to the charging port 70 via the charging cable 220.

Also, the charging cable 220 includes a signal cable attached to a power cable. The signal cable mediates communication between the vehicle 10 and the charger 200. Therefore, each of the first plug 222 and the second plug 224 is provided with a power connector and a signal connector.

The converter 72 is provided between the charging port 70 and the battery 40. The converter 72 converts a current introduced from the charger 200 via the charging port 70, for example, an AC, into a DC. The converter 72 outputs the DC obtained in the conversion to the battery 40.

The steering switch 90 includes an execution switch 90A and a changeover switch 90B. The execution switch 90A outputs calibration information to the battery state display device 100 in accordance with a pressing operation by the driver's finger. The changeover switch 90B outputs a signal for switching the display of the battery state display device 100 to the battery state display device 100 in accordance with a pressing operation by the driver's finger.

Figure 2:
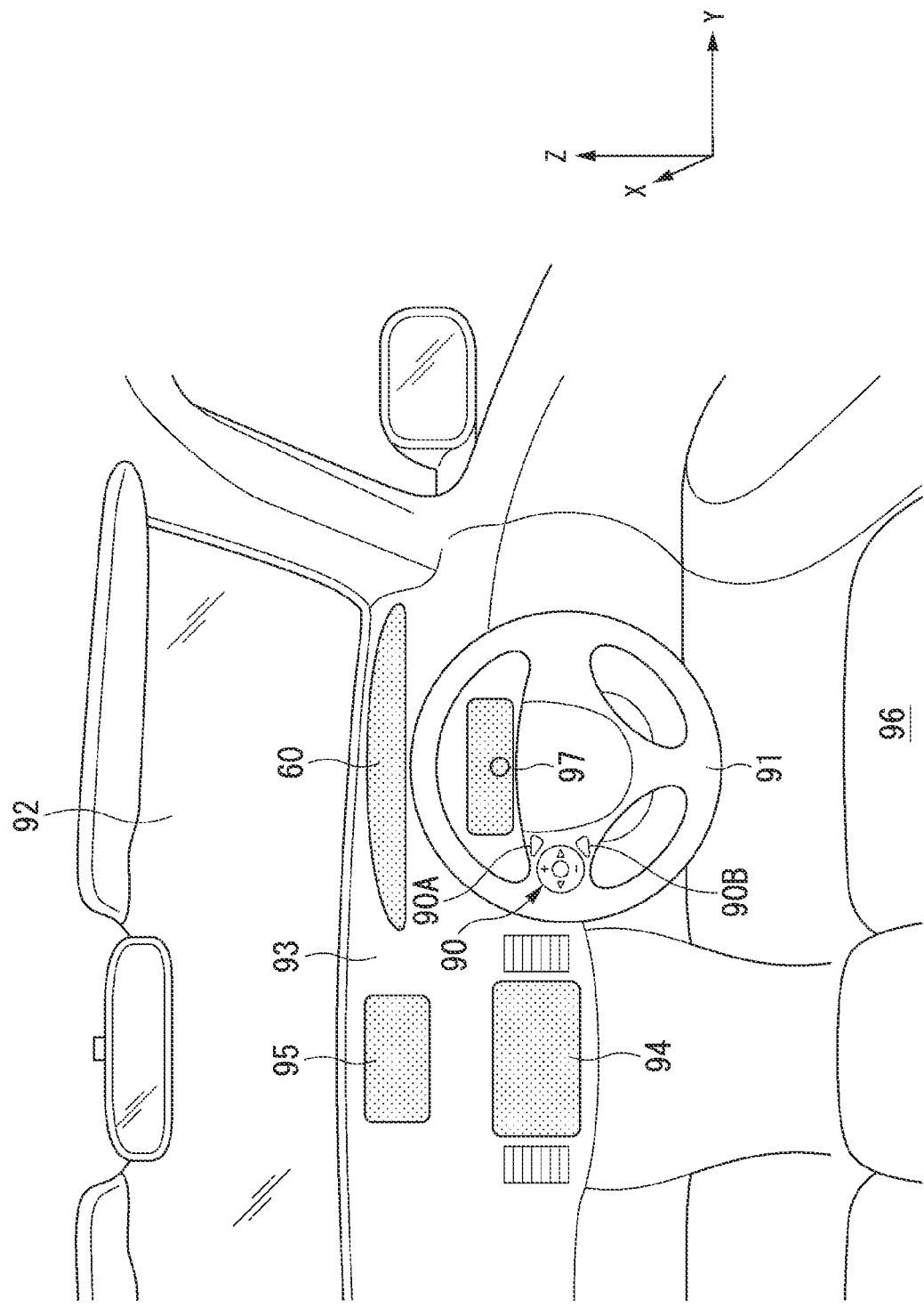
FIG. 2 is a diagram showing an example of a configuration of a cabin of the vehicle 10.

FIG. 2 is a diagram showing an example of a configuration of a cabin of the vehicle 10. As shown in FIG. 2, the vehicle 10 includes, for example, the display device 60, the steering switch 90, the steering wheel 91 that controls the steering of the vehicle 10, a front windshield 92 that separates the outside and the inside of the vehicle, an instrument panel 93, a first display device 94, a second display device 95, and an in-wheel area display 97.

The display device 60 is arranged, for example, in a meter panel unit including an instrument such as a vehicle speedometer provided on the instrument panel 93 in front of the driver's seat. The steering switch 90 is arranged on the steering wheel 91. The steering switch 90 is an input device arranged at a position where an operation by the driver's finger holding the steering wheel 91 is possible. The execution switch 90A and the changeover switch 90B of the steering switch 90 are arranged at the right end of the steering switch 90 and the execution switch 90A is arranged above the changeover switch 90B.

The front windshield 92 is a member allowing light transmission. The first display device 94 and the second display device 95 are provided near the left front of the driver's seat 96 on the instrument panel 93 within the cabin.

The first display device 94 is, for example, a liquid crystal display arranged on a central portion of the instrument panel 93. The first display device 94 is, for example, a touch panel that receives an input operation by the contact of an operator's finger. For example, the first display device 94 displays an image corresponding to a navigation process executed by a navigation device (not shown) mounted in the vehicle 10 or displays a video of the other party and the like on a videophone.

The second display device 95 is a liquid crystal display arranged above the first display device 94 on the instrument panel 93. The second display device 95 is, for example, a touch panel that receives an input operation by the contact of the operator's finger. The second display device 95 is arranged at a position where visual recognition of the driver of the vehicle 10 is easy as compared with the first display device 94. Compared with the first display device 94, the second display device 95 is arranged at a position allowing visual recognition by the driver who is driving the vehicle 10 with a smaller movement of a line of sight. The second display device 95 is arranged, for example, at a position closer to the front windshield 92 than the first display device 94, a position closer to a gaze range in front of the driver in an appropriate driving posture than the first display device 94, or the like. The second display device 95 displays a television program, performs DVD reproduction, and displays content such as a downloaded movie.

For example, the in-wheel area display 97 is arranged above the steering wheel 91. For example, the vehicle speed of the vehicle 10 or the like is displayed on the in-wheel area display 97. The display device 60 may be arranged at another position such as a position where the in-wheel area display 97 is arranged. Display content of display devices such as the display device 60, the first display device 94, the second display device 95, and the in-wheel area display 97 may be switched appropriately.

[Battery State Display Device 100]

The battery state display device 100 includes an acquirer 110, a display controller 120, a display 130, and a storage 150. The acquirer 110 and the display controller 120 are implemented by, for example, a hardware processor such as a central processing unit (CPU) executing a program (software). Some or all of these components may be implemented by hardware (including a circuit unit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be prestored in a storage device (a non-transitory storage medium) such as a hard disk drive (HDD) or a flash memory or may be stored in a removable storage medium (a non-transitory storage medium) such as a DVD or CD-ROM and installed when the storage medium is mounted in a drive device. The storage 150 is implemented by the storage device described above. The storage 150 stores various types of information.

The acquirer 110 measures a period (the number of years) that has elapsed from a time point when the battery 40 was mounted in the vehicle 10 (hereinafter referred to as an "initial time point") and a period (the number of years) that has elapsed from a time point when calibration information was output by the execution switch 90A. The acquirer 110 reads a full charge capacity map 151 stored in the storage 150. The acquirer 110 acquires a full charge capacity at a present time point and a full charge capacity of the battery 40 at the initial time point on the basis of the measured period (the measured number of years).

When the calibration information has been output by the execution switch 90A, the acquirer 110 acquires the full charge capacity of the battery 40 at that time point (a time point when the calibration information has been output by the execution switch 90A, hereinafter referred to as a "calibration start time point"). The acquirer 110 outputs the full charge capacities at the present time point, the initial time point, and the calibration start time point to the display controller 120. The calibration start time point is a prescribed time point. When the execution switch 90A is operated a plurality of times and the calibration information is output a plurality of times, the calibration start time point is set each time and a time point at which the calibration information was last output becomes a calibration start time point.

The display controller 120 causes the display to display a battery state indicating a deterioration rate of the battery 40 using the full charge capacities at the present time point, the initial time point, and the calibration start time point output by the acquirer 110. The battery state of the battery 40 differs between before and after the calibration start time point. Before the calibration start time point, the display controller 120 causes the display 130 to display a ratio of the full charge capacity at the present time point to the full charge capacity at the initial time point as the battery state of the battery. After the calibration start time point, the display controller 120 causes the display 130 to display a ratio of the full charge capacity at the present time point to the full charge capacity at the calibration start time point as the battery state of the battery.

After the calibration start time point, the display controller 120 causes the display 130 to display calibration execution information when a calibration execution information flag is turned on. The display controller 120 causes the display 130 to display the calibration execution information in a form in which it is difficult for the driver who is a general user to understand the information. The display controller 120 executes control for switching the display of the display device 60 according to a signal output by the changeover switch 90B.

The display 130 includes, for example, the display device 60 shown in FIG. 2. The display 130 is, for example, a multi-information display (MID), and displays information based on control of the display controller 120, for example, the battery state of the battery 40 and/or the calibration execution information.

Figure 3:
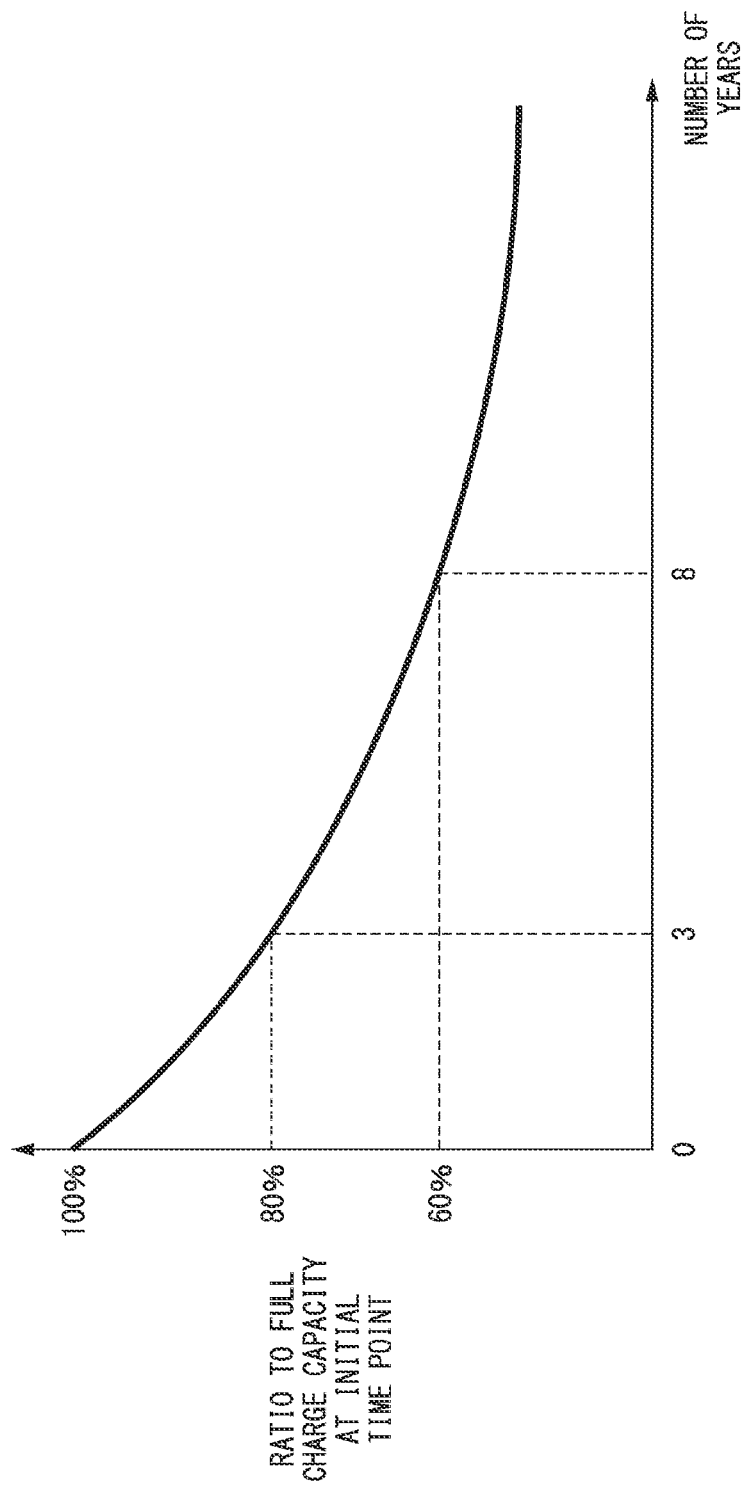
FIG. 3 is a diagram showing an example of a full charge capacity map 151.

The storage 150 stores the full charge capacity map 151 as one of various types of information. FIG. 3 is a diagram showing an example of the full charge capacity map. As shown in FIG. 3, the full charge capacity map 151 is represented by a graph showing a ratio to the full charge capacity at the initial time point on the vertical axis and showing the number of years elapsed from the initial time point on the horizontal axis. The full charge capacity map 151 sets the full charge capacity of the battery 40 at the initial time point to 100% and shows a ratio of a full charge capacity in the number of years elapsed from the initial time point to the full charge capacity at the initial time point.

In the example shown in FIG. 3, the full charge capacity map 151 in which the full charge capacity of the battery 40 at the initial time point is 100%, a full charge capacity after 3 years is 80% of the full charge capacity at the initial time point, and a full charge capacity after 8 years is 60% of the full charge capacity at the initial time point is shown. Also, for example, a design value when the battery 40 is manufactured is included as the full charge capacity at the initial time point in advance.

Figure 4:
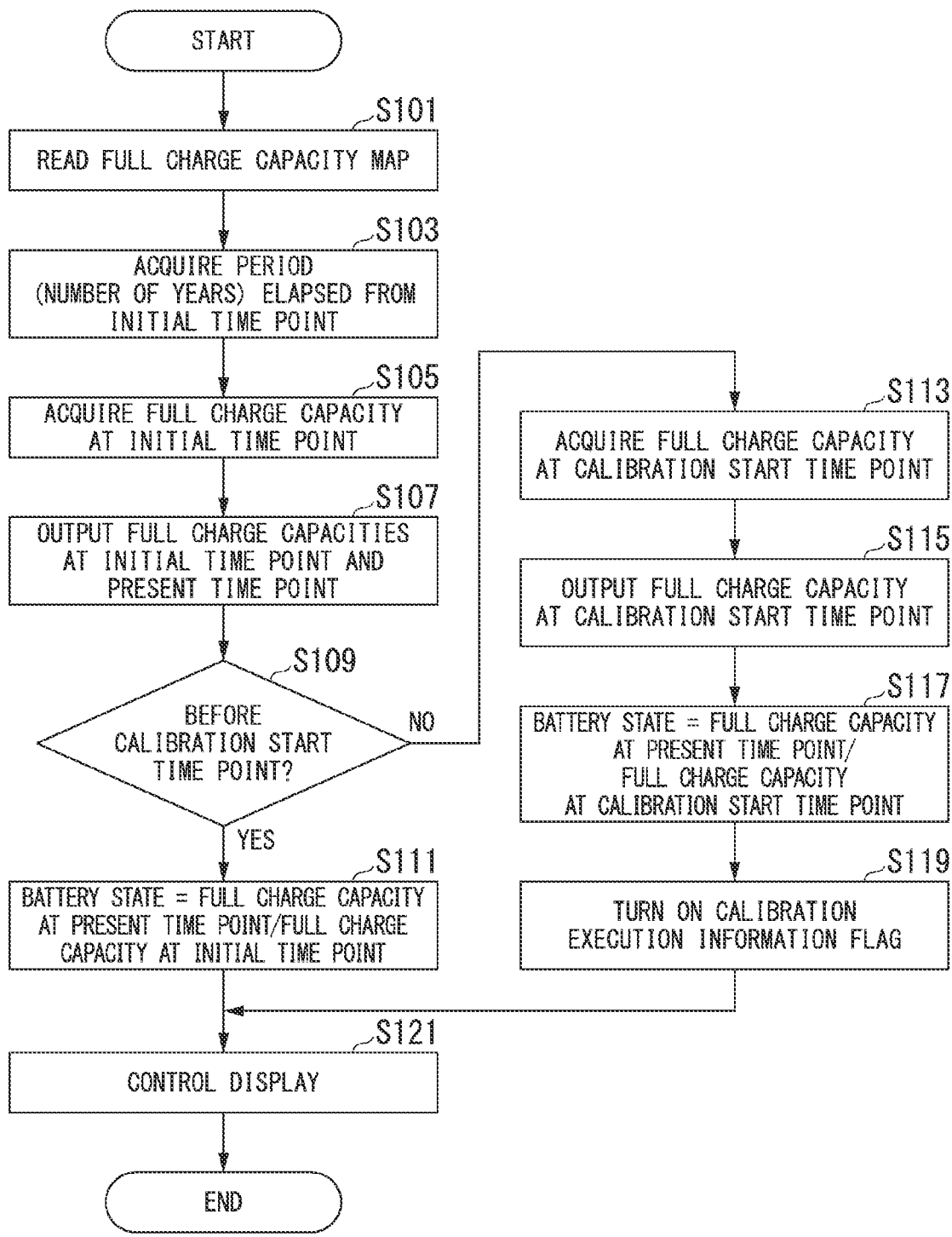
FIG. 4 is a flowchart showing an example of a process executed by the battery state display device 100.

Next, a process of the battery state display device 100 will be described. FIG. 4 is a flowchart showing an example of the process executed by the battery state display device 100. The flowchart shown in FIG. 4 is iteratively executed at certain time intervals. The acquirer 110 provided in the battery state display device 100 first reads the full charge capacity map 151 from the storage 150 (step S101).

Subsequently, the acquirer 110 acquires a period (the number of years) that has elapsed from an initial time point during measurement (step S103). Subsequently, the acquirer 110 refers to the acquired elapsed time period in the full charge capacity map 151, acquires a ratio of a full charge capacity at the present time point to the full charge capacity at the initial time point, and acquires the full charge capacity at the present time point by multiplying the acquired ratio by the full charge capacity at the initial time point (step S105).

Subsequently, the acquirer 110 outputs the acquired full charge capacity at the initial time point and the acquired full charge capacity at the present time point to the display controller 120 (step S107). Subsequently, the acquirer 110 determines whether or not the execution switch 90A has been operated and the present time point is before a calibration start time point (whether or not calibration has been performed) (step S109).

When it is determined that the execution switch 90A has not been operated and the present time point is before the calibration start time point (that calibration has not been performed), the display controller 120 calculates the battery state of the battery 40 as a ratio of the full charge capacity at the present time point to the full charge capacity at the initial time point according to the following Eq. (1) (step S111).

$$\text{Battery state}=\text{Full charge capacity at present time point}/\text{Full charge capacity at initial time point} \quad (1)$$

When it is determined that the execution switch 90A has been operated and the present time point is not before the calibration start time point (that the time point is after the calibration start time point and the calibration is being performed) in step S109, the acquirer 110 refers to the calibration start time point in the full charge capacity map 151, acquires a ratio of a full charge capacity at the calibration start time point to the full charge capacity at the initial time point, and acquires the full charge capacity at the calibration start time point by multiplying the acquired ratio by the full charge capacity at the initial time point (step S113). Also, after the full charge capacity at the calibration start time point is calculated once, a calculated value may be stored in the storage 150 and the stored full charge capacity at the calibration start time point may be read and acquired.

Subsequently, the acquirer 110 outputs the acquired full charge capacity at the calibration start time point to the display controller 120 (step S115). The display controller 120 calculates the battery state of the battery 40 as a ratio of the full charge capacity at the present time point to the full charge capacity at the calibration start time point by the following Eq. (2) (step S117).

$$\text{Battery state}=\text{Full charge capacity at present time point}/\text{Full charge capacity at calibration start time point} \quad (2)$$

Subsequently, the display controller 120 turns on the calibration execution information flag (step S119).

Subsequently, the display controller 120 controls a display process of the display 130 so that a display process based on the battery state calculated in step S113 or step S117 is performed (step S121). Further, the display controller 120 performs display control for causing the display 130 to display calibration execution information when the calibration execution information flag is turned on (step S121). In this way, the battery state display device 100 ends the flow shown in FIG. 4.

Figure 5:
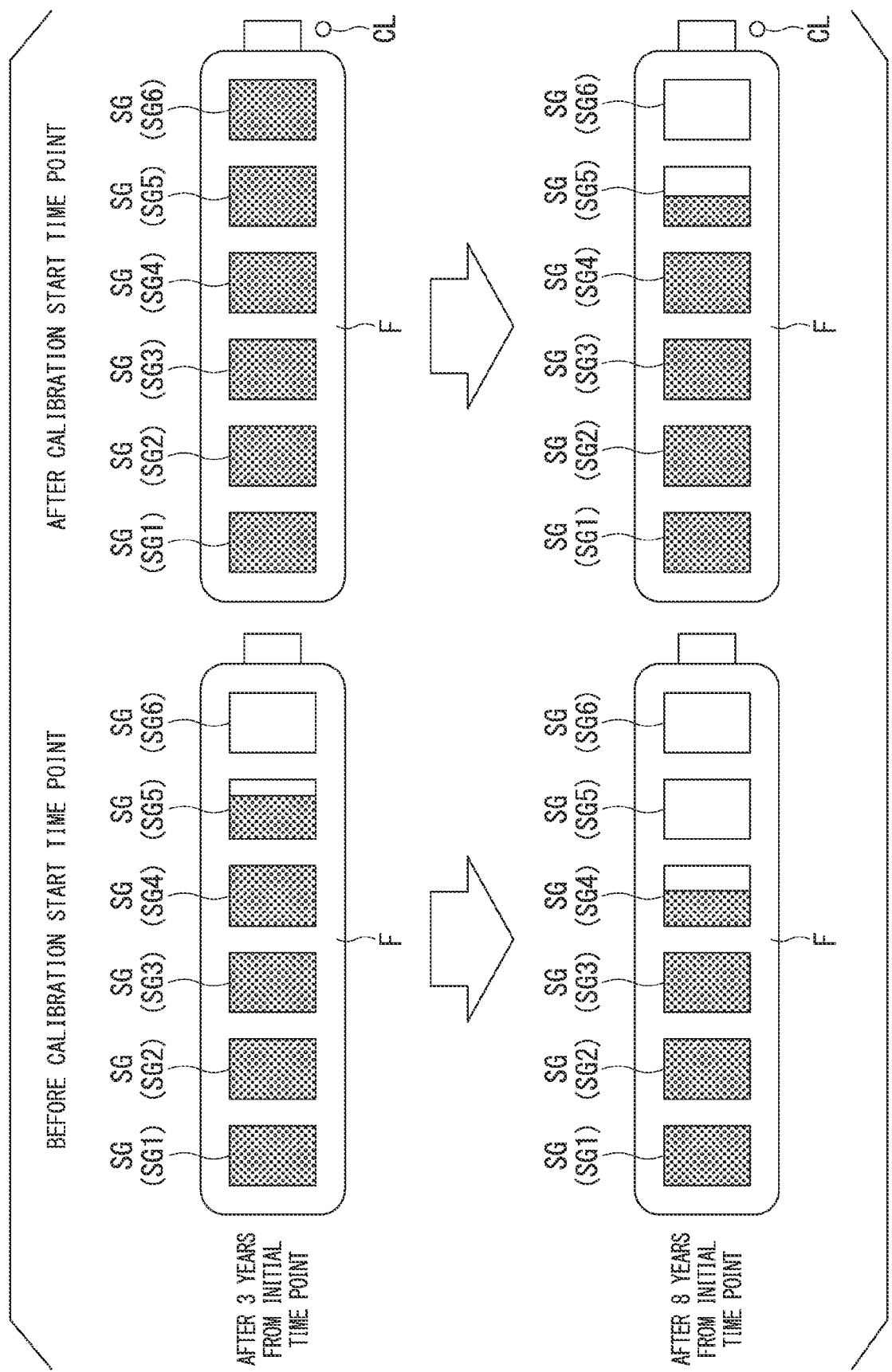
FIG. 5 is a diagram showing an example of a change in the display of a battery state.

Next, an example of a display process based on the battery state of the battery 40 will be described. FIG. 5 is a diagram showing an example of a change in a display process based on the battery state of the battery 40. In FIG. 5, an example of an image based on battery states before the calibration start time point and after the calibration start time point is shown with respect to each of the batteries 40 after the elapse of 3 years and 8 years from an initial time point.

The image based on the battery state of the battery 40 is an image in which segments SG1 to SG6 displayed inside a display frame F are brightly or darkly displayed. In the image based on the battery state of the battery 40, when the number of segments SG (SG1 to SG6), which are displayed darkly, is more, this indicates that the deterioration of the battery 40 has progressed.

For example, when the battery 40 is in the initial state and the deterioration of the battery 40 has not started, all of the 6 segments SG are brightly displayed. As the period elapses from the initial time point and the battery state of the battery 40 advances, the number of brightly displayed segments SG decreases and the number of darkly displayed segments SG increases.

For example, when 3 years have elapsed from the initial time point, for example, the battery 40 deteriorates to the extent that the full charge capacity decreases from 100% to 80%. When the calibration is not executed when 3 years have elapsed from the initial time point and the time point is before the calibration start time point, for example, as shown on the upper left side of FIG. 5, all of the first to fourth segments SG1 to SG4 among the 6 segments SG and a part of the fifth segment SG5 are displayed brightly and the sixth segment SG6 is displayed darkly. The above display process corresponds to the case where the full charge capacity at the present time point corresponds to about 80% of the full charge capacity at the initial time point. Thus, the user is allowed to recognize that the deterioration of the battery 40 has started.

Further, if 8 years have elapsed from the initial time point and the time point is before the calibration start time point, the first to third segments SG1 to SG3 and a part of the fourth segment SG4 are brightly displayed and the fifth segment SG5 and the sixth segment SG6 are darkly displayed. The above display process corresponds to the case where the full charge capacity at the present time point corresponds to about 60% of the full charge capacity at the initial time point. By performing the above display process, the user is allowed to recognize that the deterioration of the battery 40 has progressed.

On the other hand, it is assumed that the calibration is executed at a time point when 3 years have elapsed from the initial time point and the time point when 3 years have elapsed from the initial time point is a calibration start time point. After the calibration start time point, as shown on the right side of FIG. 5, the first to sixth segments SG1 to SG6 remain brightly displayed. The above display process corresponds to the case where the full charge capacity at the present time point corresponds to about 100% of the full charge capacity at the calibration start time point. Thus, the user is allowed to recognize that the deterioration of the battery 40 has not progressed from the calibration start time point.

Calibration is executed at the time point when 3 years have elapsed from the initial time point. At a time point when 8 years have elapsed from the initial time point, the first to fourth segments SG1 to SG4 and a part of the fifth segment SG5 are brightly displayed and the sixth segment SG6 is darkly displayed. The above display process corresponds to the case where the full charge capacity at the present time point corresponds to about 75% of the full charge capacity at the calibration start time point. Thus, a rate at which the battery 40 has deteriorated from the calibration start time point is shown.

Also, when the calibration is started, a calibration execution lamp CL is turned on as shown on the right side of FIG. 5. The calibration execution lamp CL is a lamp indicating information about the battery state of the battery 40 shown as a ratio of the full charge capacity at the present time point to the full charge capacity at the calibration start time point. The calibration execution lamp CL may be provided at a position other than the display 130, may be provided, for example, in a corner of the instrument panel 93, or may be provided at a position invisible from the driver's seat, for example, at a position where the battery 40 is mounted, in a trunk room, or the like. The calibration execution lamp CL is displayed in a small size at the lower right of the display frame F, and is displayed in a form in which it is difficult for a general user to understand the calibration execution lamp CL. Thus, the general user may not notice the ON state of the calibration execution lamp CL.

In this way, the display based on the battery state of the battery 40 is different between before the calibration start time point and after the calibration start time point. Also, the calibration execution lamp CL indicating that the calibration has been executed is displayed in a form in which it is difficult for a general user to understand the calibration execution lamp CL.

The battery state display device 100 of the embodiment displays the battery state of the battery 40 before the calibration start time point on the display 130 on the basis of a ratio of the full charge capacity at the present time point to the full charge capacity at the initial time point and displays the battery state of the battery 40 after the calibration start time point on the display 130 on the basis of a ratio of the full charge capacity at the present time point to the full charge capacity at the calibration start time point. Thus, because the battery state of the battery 40 is displayed on the basis of the calibration start time point, it is possible to reduce a feeling of discomfort of display of the battery state of the battery 40 given to the user.

In particular, for example, when the vehicle 10 equipped with the battery 40 is resold, it is difficult for a user who has acquired the vehicle 10 in resale to recognize the deterioration of the battery 40 due to his/her own use because the battery state of the battery 40 before resale will be inherited if the calibration is not performed. In this regard, for example, by executing calibration at a time point when the vehicle 10 equipped with the battery 40 is resold, a process in which the full charge capacity of the battery 40 at the resale time point is displayed as 100% is performed and a deterioration rate of the battery 40 can be displayed on the basis of the above value. Therefore, the user who has acquired the vehicle 10 in resale can easily recognize the deterioration of the battery 40 due to his/her own use. In this case, the resale time point becomes a prescribed time point. Also, by providing the execution switch 90A for executing the calibration, for example, the battery state of the battery 40 from a time point desired by the user can be displayed, so that the display process can be performed according to the user's request.

Further, the battery state display device 100 of the embodiment causes the display 130 to display the calibration execution lamp CL when the time point is after the calibration start time point. Thus, it is possible to recognize whether the display based on the battery state of the battery 40 displayed on the display 130 is before the calibration start time point or after the calibration start time point. The calibration execution lamp CL is displayed in a form in which it is difficult for a general user to understand the calibration execution lamp CL. Thus, for example, even if the user tries to sell the vehicle 10 to the used vehicle business operator and the like while falsely hiding a fact that the present time point is after the calibration start time point, not before the calibration start time point, the used vehicle business operator can detect the false fact.

In the above embodiment, the full charge capacity map 151 is used to acquire the full charge capacities at the initial time point, the calibration start time point, and the full charge capacity at the present time point, but these full charge capacities may be acquired by other means. For example, the control unit 36 may cause the battery state display device 100 to output an SOC of the battery 40 and obtain the full charge capacity of the battery 40 on the basis of a change in the SOC of the battery 40 or the like or may correct the full charge capacity acquired by the full charge capacity map 151 on the basis of the change in the SOC of the battery 40.

Alternatively, relationships between states of use of batteries and battery states of the batteries in a plurality of vehicles may be obtained, these relationships may be learned, and a learning result may be used to obtain the battery state of the battery. In this case, for example, a state of use of the vehicle 10 and a battery state of the battery may be transmitted to an external server and a learning result provided by the external server and the like may be used.

Although the display controller 120 does not cause the display 130 to display a ratio of the full charge capacity at the present time point to the full charge capacity at the initial time point as the battery state of the battery after the calibration is started in the above embodiment, a process of causing the display 130 to display a ratio of the full charge capacity at the present time point to the full charge capacity at the initial time point as the battery state of the battery even after the calibration is started may also be able to be performed. In this case, for example, a return switch for causing the display 130 to display the ratio of the full charge capacity at the present time point to the full charge capacity at the initial time point as the battery state of the battery even after the calibration is started or the like may be provided. When the return switch has been operated, for example, the calibration execution information flag may be turned off so that the calibration execution lamp CL is not displayed.

Although a display process based on the ratio of the full charge capacity at the present time point to the full charge capacity of the battery 40 at the initial time point and a display process based on the ratio of the full charge capacity at the present time point to the full charge capacity of the battery 40 at the calibration start time point are performed in the above embodiments, a display process may be configured to be performed with respect to a full charge capacity other than the full charge capacity at the present time point. For example, a display process based on a ratio of an estimated value of the full charge capacity after several years to the full charge capacity of the battery 40 at the initial time point or a display process based on the ratio of an estimated value of the full charge capacity after several years to the full charge capacity at the calibration start time point may be configured to be performed.

The present invention has been described above using the above embodiments, but the technical scope of the present disclosure is not limited to the scope described in the above embodiments. Those skilled in the art can make various changes or improvements to the above embodiments. It is obvious from the description of the claims that the changes or improvements may be included in the technical scope of the present invention.

INDUSTRIAL APPLICABILITY

According to the present invention, a battery state display device includes an acquirer configured to acquire a full charge capacity of a secondary battery mounted in a vehicle; a display configured to display an image; and a display controller configured to control the display so that a display process before a prescribed time point is performed on the basis of a ratio of a full charge capacity at a time point before the prescribed time point to a full charge capacity of the secondary battery at an initial time point and a display process after the prescribed time point is performed to display an image based on a ratio of a full charge capacity at a time point after the prescribed time point to a full charge capacity at the prescribed time point.

The battery state display device of the present invention is particularly useful for the cases where the impression of deterioration in a secondary battery given to a user can be reduced.

REFERENCE SIGNS LIST

10 Vehicle
12 Motor
14 Drive wheels
16 Brake device
20 Vehicle sensor
40 Battery
42 Battery sensors
60 Display device
70 Charging port
72 Converter
90 Steering switch
90A Execution switch
90B Changeover switch
91 Steering wheel
92 Front windshield
93 Instrument panel
94 First display device
95 Second display device
96 Driver's seat
97 In-wheel area display
100 Battery state display device
110 Acquirer
120 Display controller
130 Display
150 Storage
151 Full charge capacity map

What is claim is:

1. A battery state display device comprising:
a display configured to display an image;
an execution switch; and
a processor configured to:
acquire a full charge capacity of a secondary battery mounted in a vehicle;
control the display so that a display process before a prescribed time point displays the image based on a ratio of the full charge capacity at a present time to the full charge capacity at an initial time point, and a display process after the prescribed time point displays the image based on a ratio of the full charge capacity at the present time point to the full charge capacity at the prescribed time point; and
control the display so that a display process after an operation is performed on the execution switch displays the image based on a ratio of the full charge capacity at the present time point to the full charge capacity at a time point at which the operation on the execution switch has been performed.

2. The battery state display device according to claim 1, wherein the prescribed time point is a time point when the vehicle has been resold.

3. The battery state display device according to claim 1, wherein the execution switch is provided in the vehicle.

4. The battery state display device according to claim 1, wherein the processor is further configured to cause the display to display predetermined information indicating that the display process based on the ratio of the full charge capacity at the present time point to the full charge capacity at the prescribed time point is being performed based on the prescribed time point.

5. The battery state display device according to claim 4, wherein the processor is further configured to display the predetermined information smaller than the image based on the ratio.

6. A battery state display method, comprising:
acquiring, by a computer, a full charge capacity of a secondary battery mounted in a vehicle;
controlling, by the computer, displaying of an image so that a display process before a prescribed time point is performed based on a ratio of the full charge capacity at a present time point to the full charge capacity at an initial time point, and a display process after the prescribed time point is performed based on a ratio of the full charge capacity at the present time point to the full charge capacity at the prescribed time point; and
controlling, by the computer, the display so that a display process after performance of an operation on an execution switch is performed based on a ratio of the full charge capacity at the present time point to the full charge capacity at a time point when the operation on the execution switch has been performed.

7. A computer-readable non-transitory storage medium storing a program for causing a computer to:
acquire a full charge capacity of a secondary battery mounted in a vehicle;

before a prescribed time point, display an image based on a ratio of the full charge capacity at a present time point to the full charge capacity at an initial time point;

after the prescribed time point, display the image based on a ratio of the full charge capacity at the present time point to the full charge capacity at the prescribed time point; and after an operation on an execution switch, display the image based on a ratio of the full charge capacity at the present time point to the full charge capacity at a time point at which the operation on the execution switch was performed.

* * * * *